United States Patent [19]

Copps

[11] Patent Number: 4,982,702
[45] Date of Patent: Jan. 8, 1991

[54] GAME BIRD WETTING APPARATUS

[76] Inventor: Freddie C. Copps, Box 259, Dilley, Tex. 78017

[21] Appl. No.: 401,753

[22] Filed: Aug. 31, 1989

[51] Int. Cl.⁵ .............................................. A01K 29/00
[52] U.S. Cl. .................................................... 119/158
[58] Field of Search .................. 119/1, 18, 77, 78, 61, 119/155, 158

[56] References Cited

U.S. PATENT DOCUMENTS

| 1,287,671 | 12/1918 | Glidden | 119/77 |
| 1,816,849 | 8/1931 | Hoeft | 119/77 |
| 2,711,715 | 6/1955 | Thale | 119/77 |
| 2,933,064 | 4/1960 | Geerlings | 119/78 |
| 4,281,625 | 8/1981 | Kasai | 119/77 |

Primary Examiner—Gene Mancene
Assistant Examiner—R. Thomas Price
Attorney, Agent, or Firm—Jackson & Walker

[57] ABSTRACT

An apparatus is provided to permit game birds to wet the undersides of their body and wings during the egg hatching season, thereby substantially increasing the hatch yield. A shallow tray is supplied with water from a larger container and is surrounded by a wire mesh enclosure to permit access to the water only by game birds or smaller animals.

2 Claims, 1 Drawing Sheet

GAME BIRD WETTING APPARATUS

BACKGROUND OF THE INVENTION

1. Field of the Invention

The invention relates to an apparatus permitting game birds in arid regions to achieve the wetting of the undersides of their body and wings.

2. Summary of the Prior Art

To the knowledge of the inventor, no apparatus has heretofore been provided for use in arid range lands to permit game birds to achieve the wetting of the undersides of their body and wings. This wetting is essential during the nesting season since the maintenance of a high humidity atmosphere around the eggs will greatly increase the percentage of the hatch. While game birds can exist in arid regions insofar as their internal water requirements are concerned by sucking up dew from crevices in desert plants, the absence of ponds or puddles makes it impossible for the birds to achieve the desired wetting of the underside of their body and wings to promote the successful hatching of all of the eggs.

SUMMARY OF THE INVENTION

The invention provides a rectangular box-like frame structure, preferably fabricated by welding of angle iron or pipe components, including transverse members located above the ground upon which a large water storage container, such as a fiftyfive gallon drum, may be positioned. Such drum normally has a reclosable filling opening at its upper portion and a discharge opening at its lower portion. A shallow pan is provided beneath the discharge opening and a conventional valving apparatus is connected between the discharge opening and the shallow pan to control the flow of water from the large container into the shallow pan to maintain a desired level of water in the shallow pan.

The entire frame structure is then enclosed by wire mesh fencing wherein the mesh openings are large enough to permit quail or other game birds to enter the enclosure but to deny access to the water for larger animals or birds.

The diameter of the shallow pan is selected to be large enough to permit the quail or other game bird to effectively sit in the pan with its wings spread so as to achieve a thorough wetting of the underside of its body and the underside of its wings.

Further objects and advantages of the invention will be readily apparent to those skilled in the art from the following detailed description, taken in conjunction with the annexed sheet of drawings, on which is shown a preferred embodiment of the invention.

DESCRIPTION OF PREFERRED EMBODIMENT

Figure 1:
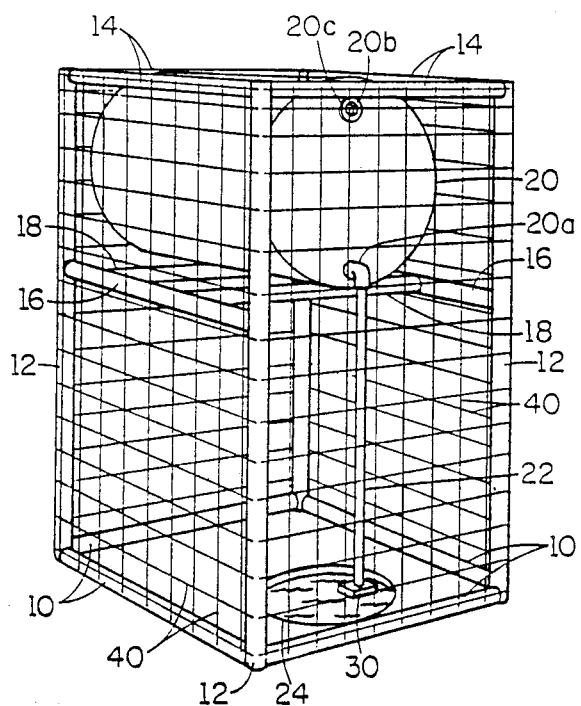
FIG. 1 is a perspective view of an apparatus embodying this invention.

Referring to FIG. 1 of the drawings, a game bird wetting apparatus embodying this invention comprises a frame structure formed by welding angle iron or tubular elements to define a generally rectangular box-like configuration. Thus, there are four base frame elements 10 connected in a rectangular configuration with upstanding vertical frame elements 12 secured to and projecting upwardly from each of the corners of the base frame elements 10. The top ends of the vertical frame elements 12 are in turn welded to the corners of a rectangular assemblage of top frame elements 14.

At a vertically medial location, at least two horizontal frame elements 16 are welded to the vertical frame elements 12 so as to be disposed in opposed relationship. Tank supporting frame elements 18 are then welded at each end to the medial frame element 16.

A drum or tank 20 is then supported on the transverse support beams 14 with the outlet opening 20a of tank 20 being disposed in a lowermost position. The fill opening 20b is thereby disposed in a vertically higher position adjacent the top end of the frame structure. The drum 20 is then filled with water through the fill opening 20b and a conventional plug 20c is threadably secured in the fill opening 20b.

Figure 2:
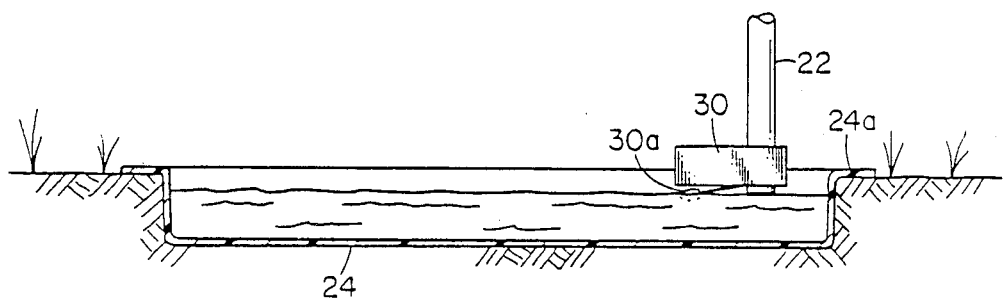
FIG. 2 is a vertical sectional view illustrating the mounting of the wetting tray in the ground.

A supply pipe 22 is provided which is conventionally connected to the discharge opening 20a and leads downwardly to a position above a tray 24 mounted in the ground. Tray 24 is best shown in FIG. 2 and preferably comprises a relatively wide shallow pan having an out-turned radial flange 22a which rests on the ground surface The depth of the pan is deliberately restricted so as to prevent the possibility of young birds getting into the pan when it is relatively full of water and drowning. On the other hand, the diameter of the pan 22 is wide enough to permit a full grown bird to settle in the pan and wet the bottom portion of its body and wings.

A conventional float valve 30 controls the flow of water downwardly through pipe 22 to the pan 24 and has a float element 30a engaging the water surface and thus maintaining a desired level of water in the pan 24.

The entire frame structure is then enclosed in a wiremesh fence 40 having openings which are large enough to permit adult game birds to enter the enclosure and get into the pan 24, but small enough to prevent cattle and other wild animals from getting at the water and consuming same by drinking.

From the foregoing description, it will be readily apparent that this invention provides an unusually effective apparatus for achieving the wetting of game birds in arid regions. As previously stated, the ability of the game bird to moisten the underside of its body and its wings during the nesting season greatly increases the percentage of successful hatching of the eggs. The utility of the apparatus embodying this invention is therefore clearly established and is distinct from watering devices which are commonly employed to permit poultry and the like to obtain drinking water. Such watering devices are not designed so as to permit a game bird, such as quail, to directly enter the water and achieve the wetting of the underside of its body and wings.

Although the invention has been described in terms of a specific embodiment which is set forth in detail, it should be understood that this is by illustration only and that the invention is not necessarily limited thereto, since alternative embodiments will become apparent to those skilled in the art in view of the disclosure. Accordingly, modifications are contemplated which can be made without departing from the spirit of the described invention.

What is claimed and desired to be secured by Letters Patent is:

1. A game bird wing wetting apparatus comprising:

a generally rectangular skeleton box frame formed by securement of bottom frame members to at least four vertical frame members;

support means traversing the interior of said box frame at an elevation above the bottom frame members;

an enclosed water container mounted on said support means;

a closable fill opening in a top portion of said water container;

a discharge opening in the bottom portion of said water container;

a shallow pan recessed into the ground beneath said discharge opening;

float controlled valve means disposed between said discharge opening and the interior of said shallow pan, said valve means being operable to maintainn a selected depth of water in said shallow pan;

said shallow pan having a water containment area large enough to permit a game bird to enter said pan and wet the undersides of its body and wings; and a wire mesh fence enclosing the four sides and the top of said box frame, the size of said wire mesh being selected to permit only quail size birds to gain access to the water in said shallow pan.

2. The apparatus of claim 1 wherein said shallow pan has a horizontal lip around its top edge, said shallow pan being recessed into the ground to position said horizontal lip substantially at ground level.

* * * * *